US008922096B2

(12) United States Patent
Beck et al.

(10) Patent No.: US 8,922,096 B2
(45) Date of Patent: Dec. 30, 2014

(54) CIRCUIT ARRANGEMENT AND METHOD FOR ACTUATING A PIEZO VALVE

(75) Inventors: Stefan Beck, Karshuld (DE); Michael Beuschel, Stammham (DE); Martin Ebel, Ingolstadt (DE); Karl Krammel, Bad Gögging (DE); Carsten Sensche, Donauwörth (DE)

(73) Assignee: Continental Automotive GmbH, Hannover (DE)

( * ) Notice: Subject to any disclaimer, the term of this patent is extended or adjusted under 35 U.S.C. 154(b) by 604 days.

(21) Appl. No.: 13/375,145

(22) PCT Filed: May 12, 2010

(86) PCT No.: PCT/EP2010/056591
§ 371 (c)(1),
(2), (4) Date: Feb. 6, 2012

(87) PCT Pub. No.: WO2010/136342
PCT Pub. Date: Dec. 2, 2010

(65) Prior Publication Data
US 2012/0126157 A1 May 24, 2012

(30) Foreign Application Priority Data

May 29, 2009 (DE) .......................... 10 2009 023 318

(51) Int. Cl.
*H01L 41/09* (2006.01)
(52) U.S. Cl.
USPC ..................................... 310/316.01; 310/332
(58) Field of Classification Search
CPC .... H01L 41/044; H01L 41/094; H04R 17/00; H01H 57/00; H01H 2057/006
USPC .................................. 310/316.01, 330–332
See application file for complete search history.

(56) References Cited

U.S. PATENT DOCUMENTS

| 4,106,065 | A | * | 8/1978 | Ravizza .................... 360/77.16 |
| 4,594,526 | A | * | 6/1986 | Araki et al. .................. 310/317 |
| 4,849,668 | A | * | 7/1989 | Crawley et al. ............... 310/328 |
| 5,032,753 | A | * | 7/1991 | Yamaguchi et al. .......... 310/317 |

(Continued)

FOREIGN PATENT DOCUMENTS

| CN | 101027469 A | 8/2007 | ............. F02D 41/20 |
| DE | 29824221 U1 | 9/2000 | ............. H02N 2/06 |

(Continued)

OTHER PUBLICATIONS

International PCT Search Report and Written Opinion, PCT/EP2010/056591, 16 pages, Sep. 2, 2010.

*Primary Examiner* — Thomas Dougherty
(74) *Attorney, Agent, or Firm* — King & Spalding L.L.P.

(57) ABSTRACT

A piezo valve is actuated by way of at least one actuator which is formed by a piezoelectric bender transducer (12) having two piezo actuators (14, 16). An actuating method has the steps of generating an actuator control signal (out), which can be output at either one of the two piezo actuators (14, 16), depending on at least one actuating control signal (in), of detecting an electric measurement quantity at one of the piezo actuators (14, 16) which is currently not controlled (16), and of generating a vibration damping signal (fb) on the basis of the detected measurement quantity and use thereof for active vibration damping for the currently controlled piezo actuator (14).

20 Claims, 4 Drawing Sheets

(56) References Cited

U.S. PATENT DOCUMENTS

| | | | | |
|---|---|---|---|---|
| 5,675,296 | A | 10/1997 | Tomikawa | 331/158 |
| 6,882,086 | B2 * | 4/2005 | Kornbluh et al. | 310/328 |
| 7,573,180 | B2 * | 8/2009 | Funakubo | 310/316.01 |
| 2002/0024268 | A1 * | 2/2002 | Yagi | 310/316.01 |
| 2005/0282047 | A1 * | 12/2005 | Kimura et al. | 429/4 |
| 2008/0042624 | A1 | 2/2008 | Augesky et al. | 320/166 |
| 2008/0149072 | A1 | 6/2008 | Rottenwohrer et al. | 123/478 |

FOREIGN PATENT DOCUMENTS

| | | | | |
|---|---|---|---|---|
| DE | 10311350 | A1 | 10/2004 | F02D 41/20 |
| DE | 10321208 | A1 | 12/2004 | F02D 41/20 |
| DE | 10346693 | A1 | 5/2005 | H02N 2/06 |
| DE | 10360702 | A1 | 9/2005 | H02N 2/06 |
| DE | 102004037719 | A1 | 3/2006 | F02D 41/20 |
| DE | 102005007327 | A1 | 8/2006 | F02D 41/20 |
| DE | 102007054814 | A1 | 5/2009 | H02N 2/06 |

* cited by examiner

Fig. 5

CIRCUIT ARRANGEMENT AND METHOD FOR ACTUATING A PIEZO VALVE

CROSS-REFERENCE TO RELATED APPLICATIONS

This application is a U.S. National Stage Application of International Application No. PCT/EP2010/056591 filed May 12, 2010, which designates the United States of America, and claims priority to DE Application No. 10 2009 023 318.0 filed May 29, 2009, the contents of which are hereby incorporated by reference in their entirety.

TECHNICAL FIELD

The present invention relates to a circuit arrangement and a method for actuating a piezo valve with at least one actuator formed by a piezoelectric bending transducer, which has (at least) two piezo actuators running in elongated fashion in each case along a longitudinal direction of the bending transducer. Furthermore, the invention relates to a use of such circuit arrangements and/or actuation methods.

BACKGROUND

Such a circuit arrangement and such a method are known e.g. from DE 103 46 693 A1. The known circuit arrangements serves for actuating a piezo valve used for controlling a closed-off volume of air. The valve can provide e.g. the three states "filling", "maintaining pressure" and "venting".

In the case of the piezo valve actuated by the known circuit arrangement, the two piezo actuators form a piezo stack composed of two piezoelectrically active components acting in opposite senses, in order to enable a deflection in both directions (transversely with respect to the longitudinal direction) with respect to an undeflected rest position.

Such piezo valves very generally have diverse fields of application. Such valves can be used very advantageously for example as controllable air valves in systems for changing the contour of motor vehicles seats.

One fundamental problem on using a piezoelectric bending transducer ("piezo bender") as actuator in a piezo valve is that the bending transducer constitutes a system having more or less pronounced mechanical resonances and can thus perform undesirable vibrations.

Such vibrations of the bending transducer can constitute an impediment of the quantitative valve function (setting of a precise degree of opening of the valve). Further disadvantageous effects are e.g. development of noise that is undesirable in many fields of application and/or an inherently unnecessary additional mechanical loading of the bending transducer.

Undesirable vibrations of the bending transducer can be brought about e.g. on account of relatively abrupt valve actuation processes. Moreover, even in the case of slow or unchanged degree of opening of the valve, such vibrations can also be brought about by the (turbulent) mass flow flowing through the valve.

The flow of the relevant medium (e.g. air, hydraulic oil, etc.) through the valve produces an excitation that is broadband in terms of frequency, whereby primarily the mechanical resonant frequencies of the bending transducer can be excited (mouth organ effect). This effect occurs to different degrees depending on the instantaneous operating conditions (inlet pressure, back pressure, effective valve cross section, viscosity of the medium, mechanical bending travel limitation, etc.).

SUMMARY

According to various embodiments, the extent of undesired vibrations of a bending transducer used as an actuator in a piezo valve can be suppressed or at least appreciably reduced.

According to an embodiment, a circuit arrangement for actuating a piezo valve with at least one actuator formed by a piezoelectric bending transducer, which has two piezo actuators running in elongated fashion in each case along a longitudinal direction of the bending transducer, may comprise: at least one driver having a driver input for inputting an actuation control signal and a driver output for generating an actuator drive signal, which is to be output optionally to one of the two piezo actuators in a manner dependent on the actuation control signal, a detection device for detecting an electrical measurement variable at one of the piezo actuators which is currently not being driven, and a feedback device for generating a vibration damping signal on the basis of the detected measurement variable and feeding back the vibration damping signal to the driver input of the driver currently being used for providing the actuator drive signal.

According to a further embodiment, the detection device may have a current source for generating a current in a line connected to the piezo actuator which is currently not being driven, and a current measuring device for measuring said current. According to a further embodiment, the line can be connected to the piezo actuator via a current-direction-dependent component. According to a further embodiment, the current measuring device may comprise a transimpedance amplifier. According to a further embodiment, a gain of the current measuring device can be provided in variable fashion. According to a further embodiment, a filter having a low-pass filter characteristic can be provided in a signal feedback path of the feedback device. According to a further embodiment, a cut-off frequency of the low-pass filter characteristic can be greater than a main resonant frequency of the bending transducer. According to a further embodiment, a cut-off frequency of the low-pass filter characteristic can be less than a first secondary resonant frequency of the bending transducer. According to a further embodiment, the filter can be an oscillatory low-pass filter having a resonant frequency between a main resonant frequency and a first secondary resonant frequency. According to a further embodiment, the vibration damping can be provided such that it can be deactivated by a deactivation of the detection device and/or of the feedback device.

According to another embodiment, a method for actuating a piezo valve with at least one actuator formed by a piezoelectric bending transducer, which has two piezo actuators extending in elongated fashion in each case along a longitudinal direction of the bending transducer, may comprise: generating an actuator drive signal, which is to be output optionally to one of the two piezo actuators, in a manner dependent on at least one actuation control signal, detecting an electrical measurement variable at one of the piezo actuators which is currently not being driven, and generating a vibration damping signal on the basis of the detected measurement variable and taking account of the vibration damping signal when generating the actuator drive signal for the piezo actuator which is currently being driven.

BRIEF DESCRIPTION OF THE DRAWINGS

The invention is described in further detail below on the basis of exemplary embodiments with reference to the accompanying drawings, in which.

DETAILED DESCRIPTION

The circuit arrangement according to various embodiments comprises at least one driver having a driver input for inputting an actuation control signal and a driver output for generating an actuator drive signal, which is to be output optionally to one of the two piezo actuators in a manner dependent on the actuation control signal. The "normal" operation of the piezo valve (setting one or more degrees of opening of the valve) can be realized with the driver or drivers.

For realizing vibration damping it is essential in this case that the circuit arrangement furthermore has a detection device and also a feedback device, such that a vibration damping signal generated in a suitable manner for vibration damping can be superimposed on the actuation control signal, by means of which one of the two piezo actuators is driven, at the driver input. For this purpose, the other piezo actuator, currently not being driven, can be utilized as a sensor for determining the vibration present (amplitude and phase angle).

Advantageously, therefore, no additional sensor system is required for the "active vibration damping" provided by the various embodiments.

With regard to the generation of the actuator drive signal to be output optionally to one of the piezo actuators for valve actuation, it is possible to have recourse to driver concepts known per se.

Thus, it is possible, for example, to use one driver jointly for the generation of the actuator drive signal to be output optionally to different piezo actuators, by virtue of the driver being equipped with a suitable changeover in order to forward the actuator drive signal generated to the piezo actuator that is currently to be driven in each case.

Another embodiment provides for a separately assigned driver to be provided for each of the two piezo actuators.

The driver can comprise, on the output side, e.g. a push-pull output stage designed for generating or setting an actuator drive voltage in a range substantially corresponding to a supply voltage of the driver.

One embodiment provides for the driver to be designed to provide an actuator drive voltage (maximum achievable voltage operationally) of more than 50V, in particular more than 100V.

By way of example, a setpoint value stipulation provided for actuator driving (actuation control signal) can be smoothed, in particular low-pass-filtered and/or ramp-limited, and provided in this fashion at the driver input. This advantageously makes it possible to reduce the effect that resonances are excited when the setpoint value is changed abruptly.

The circuit arrangement according to various embodiments can advantageously be realized by a rather slight modification of circuit arrangements already known heretofore.

The solution approach pursued by various embodiments consists, in the simplest case, in an extension of an existing circuit structure for controlling (or if appropriate regulating) one or more actuator drive signals in a manner dependent on one or more actuation control signals, wherein the extension of the existing circuit structure consists of at least one additional feedback of a signal to the input of the circuit arrangement. The signal additionally required according to various embodiments ("vibration damping signal") is generated with the aid of the piezo actuator utilized as a sensor in specific operating phases.

One embodiment provides for the piezo actuator that is utilized operationally as a sensor ("piezo actuator that is currently not being driven") always to be one and the same piezo actuator of the at least two piezo actuators and for the vibration damping according to various embodiments thus only ever to be effected during the actuation of the other piezo actuator. However, provision can also be made for utilizing operationally different piezo actuators (depending on the specific instantaneous operating situation) as a sensor.

The various embodiments make it possible to realize a robust and cost-effective vibration damping for the bending transducer used as an actuator of the piezo valve.

The bending transducer as such can advantageously be embodied in a manner known per se, e.g. as a system composed of two piezoceramic components ("bimorph"), or as a system composed of two piezoceramic components with a passive intermediate layer ("trimorph"). However, the number of piezoceramic components (piezo actuators) is in no way restricted to two. Rather, it is also possible to provide a system composed of a larger number of piezoceramic components (generally: "multimorph"). Each piezoceramic component or each piezo actuator of the bending transducer used can be constructed from a single layer of a piezoceramic (single-layer technology) or else from a plurality of such piezoactive layers (multilayer technology).

In one embodiment which should be understood by way of example, the piezoelectric bending transducer is a trimorphic bending transducer having piezo actuators embodied in each case using single-layer technology, for example.

In one embodiment, during the driving of the at least two piezo actuators of the bending transducer, the so-called transverse effect is utilized, in which the expansion or contraction direction runs transversely (e.g. perpendicularly) to the direction of the electric field generated by the driving. However, this in no way excludes utilizing the so-called longitudinal effect for one or more piezo actuators of the bending transducer during driving.

In the context of the invention it is of likewise rather secondary importance whether unipolar or bipolar driving is provided for the individual piezo actuators.

In the exemplary embodiments that will be described below, unipolar driving of a trimorphic or multimorphic bending transducer is assumed, which transducer can act in at least two directions as a result of electrical driving of at least two piezoceramics (single-layer or multilayer) acting in opposite directions.

What is essential to various embodiments is that operationally at least one actuation state is provided in which at least one of the piezo actuators is driven and at the same time at least one other of the piezo actuators is not driven. According to various embodiments, at least one of the piezo actuators currently not being driven is utilized as a "sensor" (for detecting vibration), in order to influence the driving of at least one of the piezo actuators which at the same moment are actually being driven, for the purpose of damping undesirable vibrations (active vibration damping). The various embodiments can also readily be applied to piezo actuators driven in bipolar fashion.

The piezo valve to be actuated according to various embodiments can also contain a plurality of bending transducers used for actuating the valve. One example thereof is a 3/3 way valve comprising a connection for a controllable fluid volume, a filling connection and an emptying connection, wherein a first bending transducer is used for opening and closing a passage between the controllable volume and the filling connection, and a second bending transducer is used for opening and closing a passage between the controllable volume and the emptying connection. In this case, provision can be made for the two bending transducers to be driven by one and the same actuation control signal, but complementarily to one another.

A plurality of resonant frequencies typically occur in piezoelectric bending transducers. A pronounced lowest resonance, designated hereinafter as "main resonance", can be e.g. in the range of 300 to 600 Hz. Further distinct resonances can occur e.g. above approximately 1500 Hz with in part close frequency spacings. Such resonances at higher frequencies are also designated hereinafter as "secondary resonances". It is also a special feature of secondary resonances that they appear to an intensified degree when a main resonance is excited, or can be excited by the main resonance.

Often a major advantage already arises if at least the main resonance of the bending transducer is damped, that is to say reduced in terms of its amplitude or substantially suppressed. This is because possible higher-frequency resonances such as the secondary resonances mentioned are often appreciably excited only on account of the excitation of a main resonance.

This circumstance can be taken into account suitably in the design of "filter properties" of the additional feedback provided according to various embodiments. This will be explained in even greater detail further below.

Diverse possibilities come into consideration for the detection of the measurement variable required for the active vibration damping on a piezo actuator that is currently not being driven.

In accordance with one embodiment it is provided that the detection device has a current source for generating a current in a line connected to the piezo actuator which is currently not being driven, and a current measuring device for measuring said current. In this case, ultimately a piezo current generated by the vibration of the piezo actuator is detected as a measurement variable.

The differentiation between actuator and sensor operation of a piezo actuator can occur in a simple manner by using two different voltage or current sources to act on the piezo actuator.

By way of example, in actuator operation, feeding (driving) can be effected from a voltage source, also designated hereinafter as "high-voltage source", which can be formed e.g. by an output stage of the driver used. In this case, the term "high voltage" relates to the circumstance that a voltage typically used for driving piezo actuators is significantly greater than a voltage or change in voltage at the same piezo actuator during the use thereof as a sensor. A sensor voltage thus generated is typically orders of magnitude less than the drive voltage required for driving the same piezo actuator. Against this background, the term "high voltage" within the meaning of the invention already encompasses voltages of e.g. 50V or 100V. In the case of unipolar actuator driving with such a high voltage, a second voltage source ("low-voltage source") used for feeding the piezo actuator in sensor operation can apply a lower voltage of e.g. the same polarity to the piezo actuator. This "low voltage" can be e.g. at least a factor of 10, in particular at least a factor of 50, lower than the maximum actuator drive voltage that is achievable operationally.

In one development, the abovementioned line is connected to the relevant piezo actuator via a current-direction-dependent component such as e.g. a diode. In this way, the low-voltage source can advantageously be protected against the high-voltage source via the current-direction-dependent component. The functional principle of detecting the electrical measurement variable can then be based e.g. on the fact that the low-voltage source feeds a defined current into the branch or said line of the piezo actuator operated as a sensor, which flows away e.g. via the internal resistance of a driver likewise connected to the piezo actuator (e.g. to electrical ground). The change in said current, also designated hereinafter as "detection current", on account of the piezoelectric effect can then be passed on, for instance via the current-direction-dependent component provided, if appropriate, or can be used for generating the vibration damping signal required.

In accordance with this principle, it is advantageously also possible for a plurality of piezo actuators that can be utilized as a sensor in different operating phases to be connected to a jointly utilized detection device via a corresponding plurality of respectively assigned current-direction-dependent components. These piezo actuators can thus be combined for a respective (operating-situation-dependent) signal feedback for active vibration damping (provided that only ever one of said piezo actuators in each case is utilized as a sensor).

Since the sensor signal, for instance the above-mentioned detection current or the changes thereof, is generally relatively small, amplification of this signal is recommended in the context of the detection and/or feedback.

A development which is advantageous with regard to the detection of a sensor signal provides for the current measuring device to be formed by a transimpedance amplifier.

By way of example, the change in the detection current that is brought about on account of the piezoelectric effect can be measured by means of such a transimpedance amplifier and can be used as an amplified voltage signal for the feedback or be input in a feedback device provided for this purpose.

The provision of the abovementioned current-direction-dependent component (e.g. diode) makes it possible that, during the driving of the piezo actuator, that is to say the feeding thereof from the high-voltage source, the current-direction-dependent component blocks the detection current flow and thus as it were automatically deactivates the measurement or measurement variable detection at the piezo actuator.

If, operationally, an at least approximately constant voltage is provided upstream and downstream of the current-direction-dependent component, then this advantageously makes the current measurement virtually independent of the capacitance (and the fluctuation thereof) of the relevant piezo actuator.

The described use of a current-direction-dependent component in the manner described advantageously obviates more complex measures for galvanic isolation (e.g. coupling capacitor with high-voltage capability) between the high-voltage source and low-voltage source. Signal attenuation (e.g. by means of a voltage divider) is not necessary either, and so the voltage or current swing of the piezo actuator used as a sensor can be utilized practically completely. In this case, the influence of noise on the feedback branch or control loop for active vibration damping is advantageously reduced.

The use of one and the same piezo actuator firstly as an actuator and secondly as a sensor can be controlled solely by the intended operation of the high-voltage source(s). Particularly by virtue of the abovementioned use of a current-direction-dependent component as mentioned, this changeover of the use can be effected as it were automatically and intrinsically safely. A different, in particular more complex, changeover is not required for this purpose.

With the use of a transimpedance amplifier as mentioned, the latter acts as a differentiator (relative to the bending position of the bending transducer). This differentiating behavior can advantageously be utilized or concomitantly taken into account for the phase-correct feedback required for vibration damping.

One embodiment provides for a gain of the current measuring device, in particular e.g. of a transimpedance amplifier contained therein, to be provided in variable fashion. Such a variability can e.g. advantageously be utilized operationally for setting the intensity of the vibration damping to be as high as possible, but without undesired effects occurring. To put it another way, it is thus possible to set a maximization of the damping by operation as close to possible to the (regulation-technology) stability limit, but still in the stable range. Furthermore, such a varability can be utilized operationally in order to set or adapt the intensity of the damping in a manner dependent on predetermined operating parameters or operating situations.

The detection device and/or the feedback device can be provided multiply in order to provide, in a pneumatic or hydraulic system, active vibration dampings for different bending transducers (of one or a plurality of piezo valves).

In a departure therefrom, however, it is also possible to provide a multiple utilization of the detection device and/or of the feedback device for a plurality of such different bending transducers. In this case, the above-mentioned variation of the gain e.g. advantageously makes it possible to adapt the intensity of the damping to individual driving channels or respective conditions (inlet pressure, back pressure, flow rate, line length, load volume, duration of driving, etc.). For this purpose, the amplification can be effected depending on the operating point or else adaptively. For an adaptive variation of the gain, e.g. the intensity of the resonance that respectively occurs can be determined by a measurement in the region of the feedback signal and evaluated. Such an evaluation can be carried out e.g. by a program-controlled electronic control device (e.g. microcontroller), to which a signal representative of the vibration damping signal is fed (e.g. fed via an analogue-to-digital converter). The control device can thereupon vary the extent of damping, that is to say for instance by means of a corresponding setting of said gain in accordance with an algorithm, in order to minimize the undesirable vibrations of the bending transducer.

A change in the gain to zero corresponds to a deactivation or total shutdown of the vibration damping.

In accordance with one embodiment it is provided that the vibration damping is provided such that it can be deactivated by a deactivation of the detection device and/or of the feedback device. Such a deactivation can be effected e.g. in a manner dependent on operating parameters which are detected at a relevant pneumatic or hydraulic system, and can be realized e.g. by means of the abovementioned variation of the detection gain to zero.

With optional switching-on and shutdown of the vibration damping, in particular in specific operating situations by means of a shutdown the dynamic range of the valve actuation can be improved and/or possible other undesirable effects of the active vibration damping can be avoided. Testing of the damping is likewise possible as a result.

Such a possibility for testing is e.g. interesting for a diagnosis with regard to the proper function, whether it be in the context of the production of the circuit arrangement or of a system equipped therewith, or in later operation of such a system (e.g. diagnosis in a workshop).

If a transimpedance amplifier as already described above is used for detecting the measurement variable on the piezo actuator that is currently not being used, then the shutdown of the damping can be realized by means of a band-limited or ramp-limited change in a reference voltage of the transimpedance amplifier, such that said amplifier or e.g. a filter (e.g. low-pass filter) connected downstream is in saturation. Band limiting ensures soft suppression and subsequent commencement of the damping (whilst avoiding an additional excitation of a resonance).

The additional signal feedback provided according to various embodiments for the active vibration damping should act substantially only in a frequency range lying outside the useful frequency range of the valve or "normal" actuator driving (actuator voltage setting). If such a voltage setting is designed for DC voltage operation and the low frequency range, it is evident from this that the additional feedback has to have a bandpass characteristic above that. In the design of the feedback device, the behavior of the remaining circuit parts used for the actual actuator driving (e.g. with a low-pass filter characteristic) is expediently to be taken into consideration or to be designed/optimized in a suitable fashion.

One embodiment provides for the feedback device or the feedback of the vibration damping signal not to be "hard-wired" but rather implemented by means of a program-controlled electronic device (e.g. microcontroller). In this case, the signal to be fed back can be determined by means of a software-based algorithm. In this case, the measurement signal detected at the piezo actuator that is currently not being driven can be read into the program-controlled device by means of an analogue-to-digital converter, which program-controlled device generates the vibration damping signal in accordance with an algorithm and outputs it e.g. via a digital-to-analogue converter or as a PWM signal. In this case, a sufficiently high sampling frequency is to be provided in order to minimize disadvantageous effects as a result of dead times. The program-controlled device can also vary the variation—already discussed above—of the extent of the vibration damping operationally (in a manner dependent on predetermined criteria), for instance in order to provide different operating modes for the active vibration damping.

In one embodiment, the mechanical transmission behavior of the oscillatory system "piezoelectric bending transducer" is damped by the additional signal feedback at least in the range of the main resonant frequency, for which purpose the detected electrical measurement variable or the vibration damping signal generated on this basis is fed back regulation-technologically for the purpose of negative feedback in a known manner with the smallest possible phase shift (absolute value of the phase response in the open control loop very much less than 180°).

The frequency range of the additional feedback is influenced or limited by the finite bandwidth of the circuit components (e.g. driver, detection device, feedback device). Therefore, in particular it is not possible to damp secondary resonances of a higher frequency for which the phase shift or phase delay of the open control loop exceeds a certain extent (e.g. greater than nor equal to 180°). In such frequency ranges, the gain of the additional feedback must always be very much less than 1, in order to ensure the stability and robustness in the regulation-technological sense.

With regard to such criteria for the active vibration damping, it should be noted that, by virtue of the frequency selectivity, the actuator voltage setting and vibration damping can be embodied both in parallel and in cascade structure.

One embodiment provides for a filter having a bandpass or low-pass filter characteristic to be provided in a signal feedback path of the feedback device. A delimitation between the above-explained requirements or criteria for an active vibration damping can thus advantageously be effected.

One development provides for a cut-off frequency of the low-pass filter characteristic (or upper frequency of a bandpass filter characteristic) to be greater than a main resonant frequency of the bending transducer and/or less than a first secondary resonant frequency of the bending transducer.

Although conventional low-pass filters (e.g. Bessel, Butterworth, Chebyshev, Cauer) fulfill the requirement of a low amplitude gain in the range of relatively high frequencies or secondary resonances, they already lead to an appreciable phase delay in the range of the main resonance. This significantly reduces the stability reserve or the achievable damping or makes the latter practically impossible.

One development therefore provides for the filter to be an oscillatory low-pass filter having a (at least one) resonant frequency preferably lying between a main resonant frequency and a first secondary resonant frequency. Thus, the requirements explained above can advantageously be fulfilled in a comparatively simple manner, particularly if an oscillatory low-pass filter having a high quality factor (e.g. at least 2, in particular at least 5) is used.

If the resonant frequency of the low-pass filter lies between the main resonance (e.g. lowest main resonance) and the lowest secondary resonance of the bending transducer, it is thus possible to significantly reduce the amplitude gain in the range of the secondary resonances, without bringing about an excessively high phase shift in the range of the main resonance.

It is advantageously possible to use an even-order low-pass filter having no real pole and, consequently, no premature phase decrease below the cut-off frequency.

In one embodiment, the resonant frequency of the low-pass filter lies in a frequency range in which the bending transducer has a relatively high damping (band-stop filter characteristic). The amplitude magnification of the low-pass filter is thus harmless for the damping or the regulation-technological stability.

Advantageously, the driver and/or high-voltage amplifier and/or other components involved in the additional feedback can also be embodied with a similar characteristic to the low-pass filter (or bandpass filter) or be designed/optimized to that effect. Thus, the effect of the low-pass filter described can additionally be supported.

One embodiment provides for the feedback of the vibration damping signal to the driver input to be effected via a coupling capacitor or in some other way with a suppression of the DC signal component (e.g. with a bandpass filter characteristic). Such a coupling-in of the vibration damping signal affords advantages, in particular, if a quiescent voltage level of the feedback for the damping is not at a correspondingly neutral voltage (e.g. 0V).

In the case where the damping signal is coupled in, it is advantageously possible to provide a targeted phase correction (e.g. so-called PDT1 behavior) in order to optimize the phase response in the range of the main resonance.

One use of the circuit arrangement and/or of the actuation method according to various embodiments is the actuation of a fluid valve (e.g. air valve) which is used for changing the contour of a motor vehicle seat.

In one development of this use, at least two operating modes are provided for changing the contour of the seat, namely a first mode ("driving dynamics mode"), in which an extent of filling (e.g. fluid pressure or air pressure) of a closed contour changing volume is set automatically in a manner dependent on a driving state of the relevant vehicle, and a second operating mode ("user setting mode"), in which said extent of filling is effected in a manner dependent on user inputs (on operating elements provided for this purpose, such as electrical switches, etc., or by means of an on-board computer).

Moreover, a third operating mode can be provided, for example, which is provided for readjusting the extent of filling over relatively long periods of time (e.g. approximately minutes to days).

Preferably, the extent of the active vibration damping (e.g. by setting the detection device and/or the feedback device) is varied in a manner dependent on the instantaneous operating mode.

By way of example, provision can be made for the extent of vibration damping to be set to be smaller in the driving dynamics mode than in the user operation mode.

Figure 1:
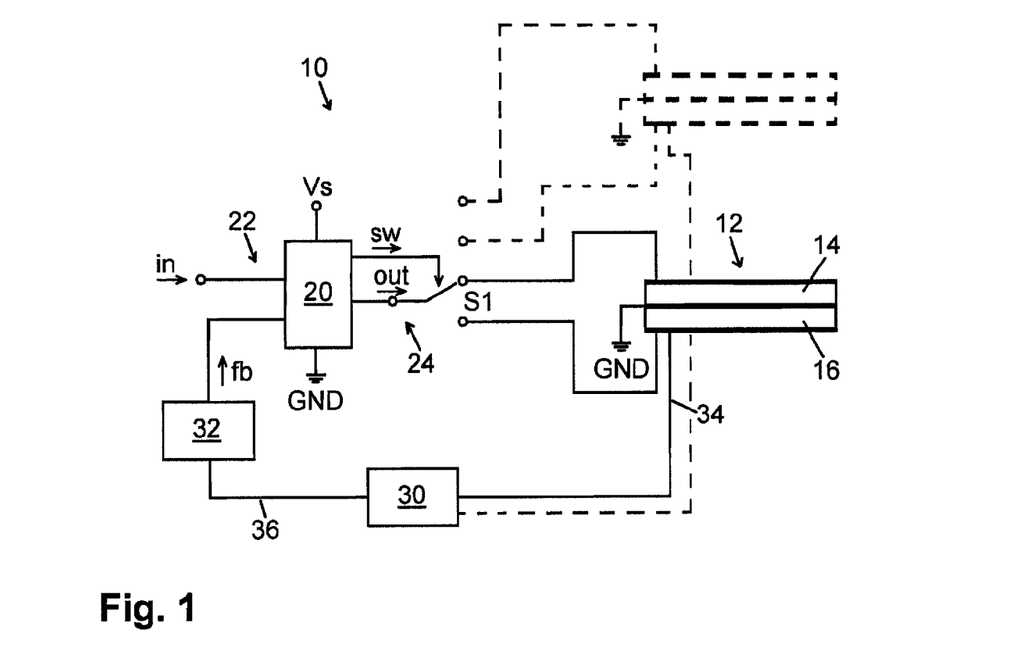
FIG. 1 shows a schematic block diagram of a circuit arrangement for actuating a piezo valve in accordance with a first exemplary embodiment.

FIG. 1 shows a circuit arrangement 10 for actuating a piezo valve with at least one actuator formed by a piezoelectric bending transducer 12, which has two piezo actuators 14, 16 running in elongated fashion in each case along a common longitudinal direction of the bending transducer 12.

In the exemplary embodiment illustrated, a bimorphic or trimorphic bending transducer 12 is involved, which can be driven in two effective directions (transversely with respect to the longitudinal direction) by an actuator drive signal "out" (actuator voltage) to be applied optionally to one of the two piezo actuators 14, 16.

In a manner known per se, e.g. a free end of the bending transducer 12 can be embodied as a valve body controlling the flow through the piezo valve or can be provided with such a valve body. If the valve body, in the undriven state of the bending transducer 12 (both actuator voltages 0V), is arranged at a small distance from the orifice of a fluid transmitting passage of the valve, than e.g. a (full) opening or closing of the valve can be effected by the optional driving of one of the two piezo actuators 14, 16. However, it is equally readily conceivable for the valve body, with the bending transducer not being driven, already to close such an orifice and for the valve to be opened or the bearing force of the valve body at the orifice (in the valve closing direction) to be amplified by the optional driving of one of the two piezo actuators 14, 16.

What is essential is that, during the operation of the circuit arrangement 10 for actuating the piezo valve, operationally situations are provided in which only one of the two piezo actuators 14, 16 is driven (has an actuator voltage applied to it), whereas the other piezo actuator remains undriven at this moment.

In the exemplary embodiment illustrated, in order to generate the actuator drive signal "out", provision is made of a driver 20 having a driver input 22 for inputting an actuation control signal "in" and a driver output 24 for generating or outputting the actuator drive signal "out". The driver 20 is assigned a changeover device, which is symbolized by S1 in the figure and by means of which the drive signal out can be fed optionally to the piezo actuator 14 or the piezo actuator 16. This changeover is realized by means of a changeover signal "sw", which is likewise generated on the basis of the actuation control signal in and output by the driver 20.

The driver 20 is supplied by a supply voltage between potentials Vs and GND (electrical ground) and supplies as the actuator drive signal out an actuator drive potential set between said supply potentials GND, Vs to a drive electrode of the relevant piezo actuator 14 or 16. A second drive electrode of the piezo actuators 14, 16 is provided jointly for both piezo actuators and connected to the electrical ground GND.

One special feature of the circuit arrangement 10 is that the latter furthermore comprises a detection device 30 and a feedback device 32.

By means of the detection device 30, in operating situations in which the piezo actuator 16 is not driven, an electrical measurement variable is detected at said piezo actuator 16, said variable being representative of the vibration state of the bending transducer 12 in some way. For this purpose, the detection device is connected via at least one line 34 to the piezo actuator 16 used as a "sensor" for a vibration state.

In the simplest case, the electrical measurement variable could be e.g. a piezo voltage which is generated by means of the piezoelectric effect at the piezo actuator 16 in a manner dependent on the bending state of the bending transducer 12 and which is transmitted via the line 34 to the detection device 30 and e.g. amplified there.

In another embodiment, the detection device 30 itself generates an electrical measurement variable (e.g. voltage or current, constant or variable) and measures, and if appropriate amplifies, an electrical measurement variable which can be detected in response thereto at the piezo actuator 16.

The detection device 30 is connected via at least one line 36 (or line arrangement) to the feedback device 32, which serves to generate a vibration damping signal "fb" on the basis of the detected measurement variable and to feed back said vibration damping signal fb to the driver input 22 of the driver 20. A further amplification and/or other signal conditioning or signal conversion (e.g. filtering, in particular phase shift) can be effected in the region of the feedback device 32.

The vibration damping signal fb fed back influences the generation—effected at this moment by the driver 20—of the actuator drive signal out for the active piezo actuator 14 in the sense of a reduction, if not even substantially complete suppression of undesirable vibrations of the bending transducer 12. In the simplest case, the vibration damping signal "fb" is suitably superimposed on the actuation control signal "in" likewise input at the driver 20.

It goes without saying that, in the feedback path formed by the component 34, 30, 36 and 32, signal processing suitable for the vibration damping (e.g. by means of analogue and/or digital, passive and/or active filters) has to be provided.

During the operation of the circuit arrangement 10, the piezo actuators 14, 16 are driven alternately, that is to say that driving of the piezo actuator 16 takes place only after the other piezo actuator 14 has been deactivated again (setting of the actuator drive voltage to 0V), and vice versa. In the example illustrated, the active vibration damping realized by means of the detection device 30 and the feedback device 32 acts only during the driving of the piezo actuator 14. When the piezo actuator 16 is driven, and accordingly the piezo actuator 14 is not driven, no vibration damping is provided. This can be expedient e.g. in particular in the case in which, when the piezo actuator 16 is driven, no bending of the bending transducer 12 takes place, but rather only a generation of force, whereas the driving of the piezo actuator 14 brings about a bending (in the case of which undesirable vibrations can occur).

In a departure therefrom, an active vibration damping could, of course, also be provided for the driving of the piezo actuator 16, for instance by a second feedback path being formed by a further detection device and a further feedback device, said second feedback path running from the piezo actuator 14 to the driver input 22. In a modified embodiment variant, the components 30, 32 illustrated in the figure could also be used for this purpose, wherein, with regard to the detection of the electrical measurement variable, an operating-situation-dependent changeover between the piezo actuators 14, 16 respectively to be used as a sensor is effected.

FIG. 1 depicts in a dashed fashion one possible extension for a driving of a further piezoelectric bending transducer, which can likewise be actuatable by means of the driver 20 and by which likewise one of the piezo actuators can be connected to the detection device 30 in order to utilize it as a vibration sensor in the non-driven state.

In the following description of further exemplary embodiments, the same reference numerals are used for components having an identical effect, in each case supplemented by a lower-case letter for distinguishing the embodiment. In this case, essentially only the differences with respect to the exemplary embodiment or exemplary embodiments already described will be discussed and for the rest reference is hereby expressly made to the description of previous exemplary embodiments.

Figure 2:
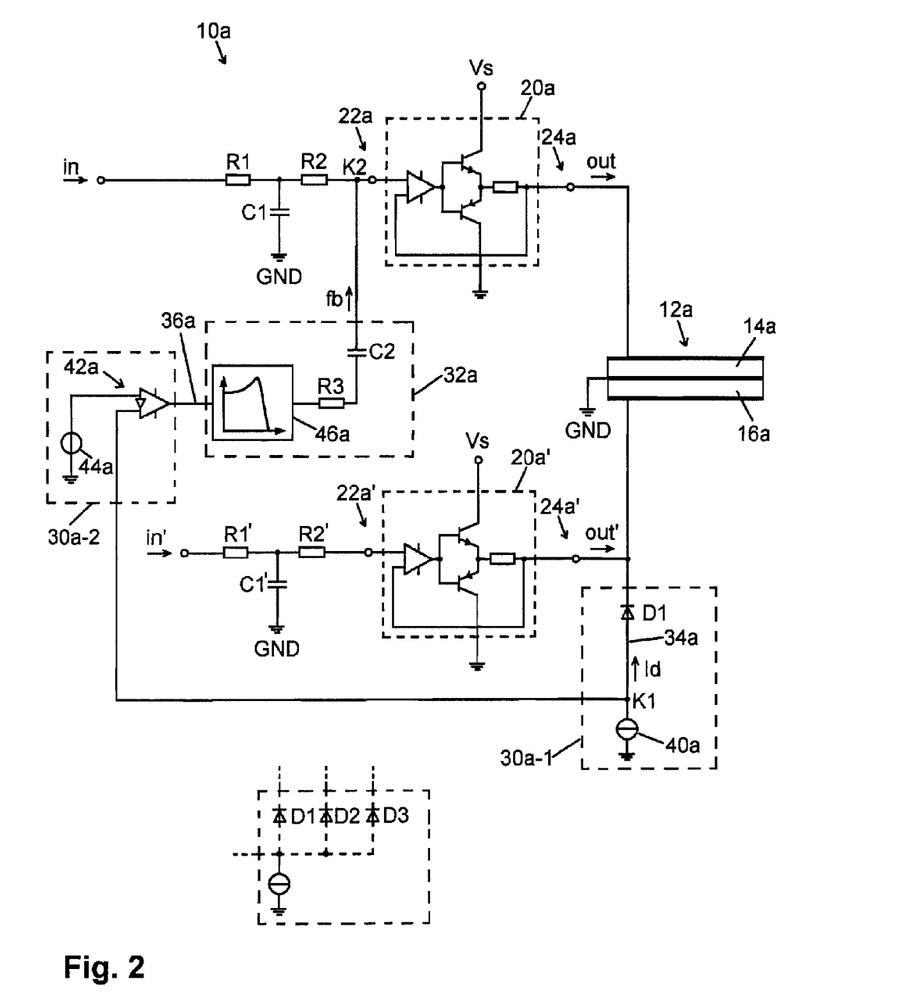
FIG. 2 shows a schematic block diagram of a circuit arrangement for actuating a piezo valve in accordance with a second exemplary embodiment.

FIG. 2 shows, in a somewhat more detailed block diagram, a further exemplary embodiment of a circuit arrangement 10a for actuating a piezo valve with at least one piezoelectric bending transducer 12a.

The circuit arrangement 10a comprises two drivers 20a and 20a', which are respectively assigned to one of two piezo actuators 14a, 16a of the bending transducer 12a.

The driver 20a generates an actuator drive signal out to be output as necessary to the piezo actuator 14a in a manner dependent on a first actuation control signal in, which is input at an input 22a of the driver 20a via a smoothing filter consisting of resistors R1, R2 and a capacitor C1. The driver 20a generates an actuator drive signal out' to be output as necessary to the piezo actuator 16a in a manner dependent on a second actuation control signal in', which is input at an input 22a' of the driver 20a' via a smoothing filter consisting of resistors R1', R2' and a capacitor C1'.

As in the exemplary embodiment in accordance with FIG. 1, in the case of the circuit arrangement 10a, too, an active vibration damping is provided only in operating phases of a driving of the piezo actuator 14a, the other piezo actuator 16a, which is not driven at this moment, being utilized as a sensor for determining the vibration present.

In a drive line running from an output 24a' of the driver 20a' to the piezo actuator 16a, at a circuit node K1a branch to a line 34a' is provided, via which a measurement current Id is passed to the circuit node K1, which is generated by the current source 40a symbolized in the figure and flows away toward the electrical ground GND via the internal resistance of the driver 20a' (the current source 40a can be realized e.g. by means of a resistor fed by a stabilized voltage (low voltage)).

The measurement current Id is passed via a diode D1 to the circuit node K1 and varies depending on a vibration of the bending transducer 12a. Via a connection of the line 34a' to a transimpedance amplifier 42a (with reference voltage source 44a), the measurement current Id or the changes thereof is/are measured and amplified.

A voltage signal thus generated at the output of the transimpedance amplifier 42a on the basis of the detected measurement variable is input to a low-pass filter 46a and coupled in via a resistor R3 and a coupling capacitor C2 as a vibration damping signal fb at the driver input 22a (circuit node K2).

The current source 40a connected via the diode D1 to the piezo actuator 16a that is currently not being driven and the transimpedance amplifier 42a thus form components 30a-1 and 30a-2, respectively, of a detection device 30a for detecting and amplifying the electrical measurement variable.

The transimpedance amplifier 42a used can be e.g. an inverting operational amplifier correspondingly connected up externally (not illustrated) which sets the voltage at the diode D1 to a reference voltage and measures the current required for this purpose. The reference voltage can be generated e.g. via a port of a microcontroller and a low-pass filter connected downstream.

A feedback device 32a is formed by the low-pass filter 46a and the components R3, C2. The low-pass filter 46a is preferably embodied as an active filter, and with further preference is realized e.g. as a so-called "Sallen-Key-Filter".

In the detection method described, a changeover between the types of use (actuator and sensor) for the piezo actuator 16a is effected as it were automatically.

In contrast to a software-based solution, in the case of the "hard-wired" solution in accordance with FIG. 2, time-discrete sampling is not necessary. This avoids additional phase delay in the feedback such as always occurs to a greater or lesser extent in the case of a limited sampling frequency.

Instead of the diode D1 leading from the line 34a to a circuit node (K1) in a piezo driveline, a plurality (parallel arrangement) of such diodes could also be provided, which respectively lead from such a current source 40a to different circuit nodes provided in even further drive lines (not illustrated) of the circuit arrangement (for driving further bending transducers). Thus, it is possible to multiply utilize the circuit for feedback for the purpose of vibration damping (provided that the relevant bending transducers are not operated simultaneously). On the output side, the feedback is then fed back to all of the relevant inputs (at most one of which in each case is active). A corresponding exemplary modification of the component 30a-1 with three diodes D1, D2, D3 is depicted in dashed fashion in the lower part of FIG. 2.

After slight modification of the circuit arrangement illustrated in FIG. 2, it can also be utilized for the complementary driving of a pair of bending transducers, e.g. for actuating the 3/3 way valve already mentioned further above with two valve passages, each of which is assigned a bending transducer. For this purpose, the second bending transducer can be added to the first bending transducer illustrated in FIG. 2 in a parallel circuit, such that when one drive voltage "out" is output, one respective piezo actuator of the two bending transducers is driven, and when the other drive voltage "out'" is output, the respective other piezo actuator of the two bending transducers is driven. The sensor signal detection and feedback for the purpose of vibration damping, as illustrated in FIG. 2, can be utilized, after slight modification, for the second bending transducer as well. For the detection of the further sensor signal it is possible to have recourse e.g. to the above-explained parallel arrangement of diodes for the purpose of multiple utilization of the current source 40 and the remaining components of the detection and feedback. Furthermore, a corresponding further coupling-in connection would have to be produced between the component 32a and the second driver input 22a', e.g. by means of a further coupling-in capacitor (corresponding to the capacitor C2 illustrated). Alternatively, in this case parts of the circuit can also be utilized jointly in accordance with the extension of FIG. 1, in particular also the coupling-in connection. FIG. 3 illustrates once again a possible configuration of the circuit arrangement 10a in a functional block diagram.

Figure 3:
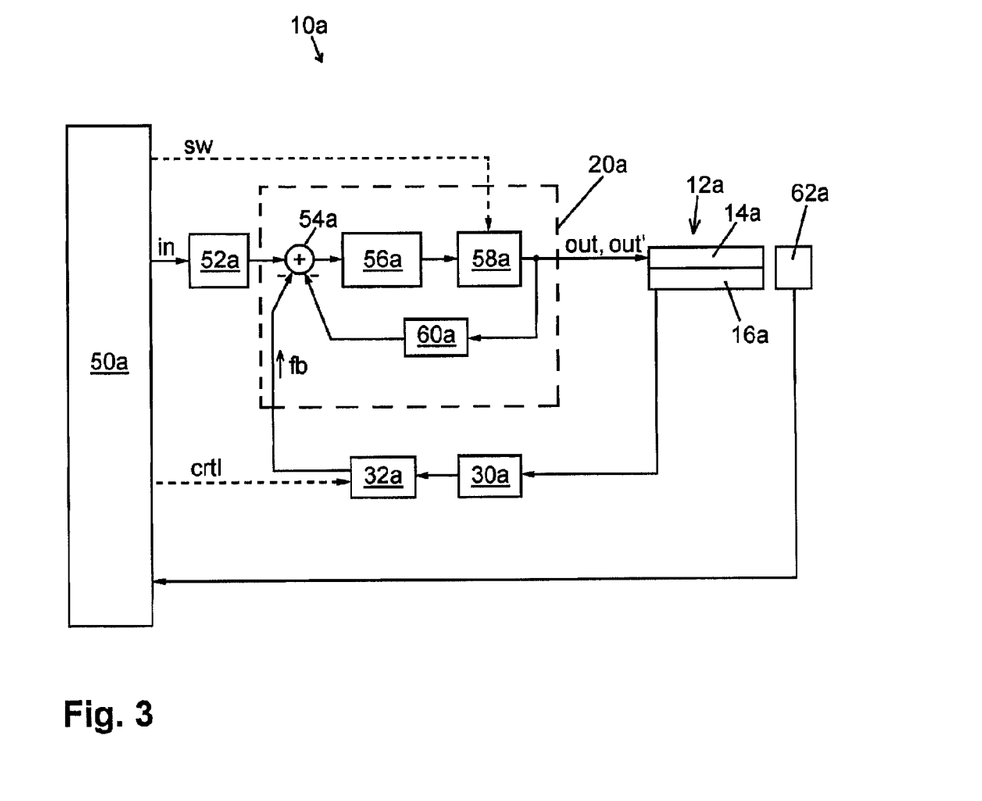
FIG. 3 shows a schematic functional block diagram of a more specific embodiment of the circuit arrangement from FIG. 2.

This illustration also depicts a program-controlled electronic control device in the form of a microcontroller 50a, by means of which the actuation control signal in (e.g. as a PWM signal) is generated and fed to the smoothing filter 52a (corresponding to the components R1, C1, R2 in FIG. 2). The smoothed input signal is fed to a PI regulator 56a via an addition element 54a. The output signal of the PI regulator 56a is fed to an output stage 58a, which, in a manner dependent on this driving, generates the actuator drive signal out or out' and outputs it to the bending transducer 12a.

The outputting of the signal out or out' as necessary to the piezo actuator 14a or 16a, respectively, is controlled by means of a changeover signal sw likewise generated by the microcontroller 50a.

In the example illustrated, the actuator drive signal out, out' output as a voltage signal is regulated by means of a measuring element 60a, which measures the actual actuator voltage ("actual signal") and feeds it back to the addition element 54a for the purpose of comparison with the actuation control signal ("setpoint value").

The active feedback for the damping of undesirable vibrations during the driving of the piezo actuator 14a is symbolized in the figure by the components 30a and 32a (detection device and feedback device).

In order to realize a controllable variation of the extent of the active vibration damping, the microcontroller 50a furthermore generates a corresponding activation/deactivation signal crtl, by means of which the gain effected in the feedback device 32a (transimpedance amplifier) can be varied (through to a total shutdown of the active vibration damping). In order to carry out a gain variation adaptively, e.g. the signal "fb" can be input into the microcontroller 50a via an analogue-to-digital converter (not illustrated in FIG. 3).

With regard to a use of the piezo valve for a fluid pressure setting in a fluid volume, FIG. 3 depicts a pressure measuring device 62a, which outputs to the microcontroller 50a a measurement signal representative of the actual fluid pressure.

Figure 4:
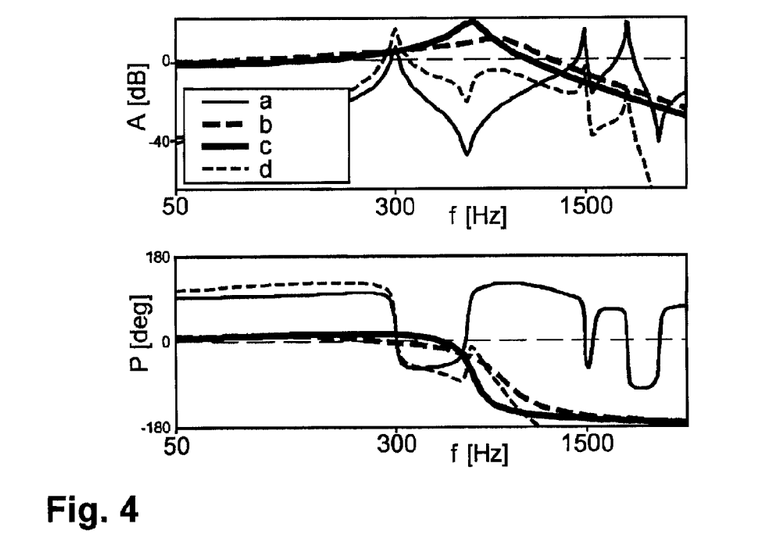
FIG. 4 shows a diagram of diverse transfer functions (concerning amplitude A and phase P) in the circuit arrangement in accordance with FIGS. 2 and 3.

FIG. 4 shows, merely by way of example, a diagram with (simulated) frequency and phase responses of different signal paths of the circuit arrangement 10a.

In the diagram, the profile "a" describes the transfer function from the output of the driver to the output of the transimpedance amplifier. The amplitude of the secondary resonances is of a similar level to that of the main resonance or even higher.

The feedback for the active vibration damping and the amplifier (profile "b") in each case have a low-pass filter behavior having a high quality factor. As a result, the phase in the range of the main resonance remains substantially constant.

The amplitude magnification of the low-pass filter (profile "c") falls into a range of great damping of the piezo actuator and as a result, in the transfer function of the open control loop (profile "d"), does not lead there to an amplitude gain which is in the range of 0 dB or higher.

The transfer function of the open control loop (profile "d"), shows that the damping is stable in the regulation-technological sense, since, in the entire frequency range, either the amplitude A is less than 0 dB or the absolute value of the phase P is very much less than 180°. A sufficient phase or amplitude reserve is present and makes the damping sufficiently robust in the case of parameter fluctuations.

Figure 5:
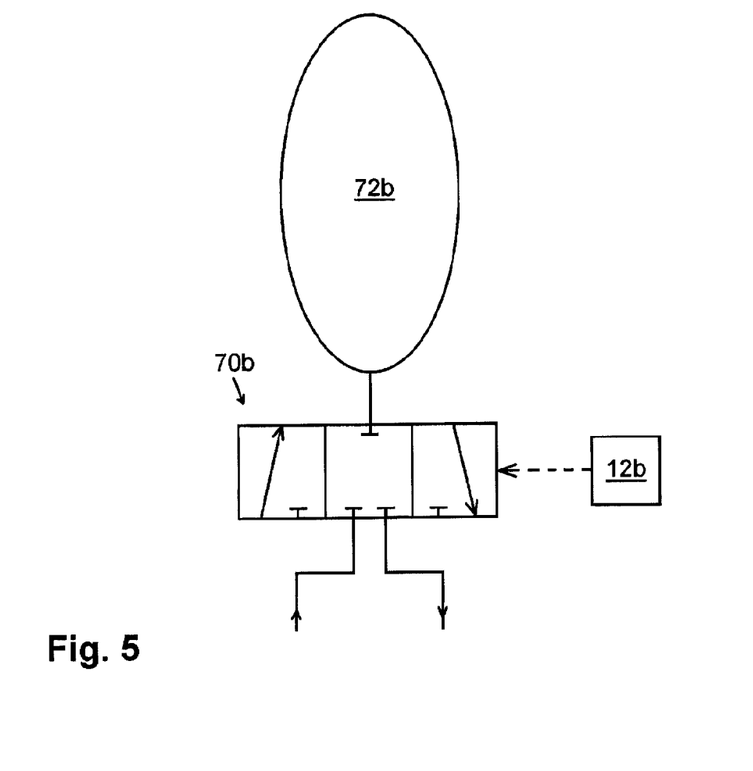
FIG. 5 shows an illustration for elucidating an application example of a piezo valve embodied as a 3/3 way valve.

FIG. 5 illustrates the use of a bending transducer 12b (or an arrangement of a plurality of such bending transducers) driven in the manner described above as actuator(s) of an (e.g. proportional) directional valve, here a proportional 3/3 way valve 70b for filling and emptying a fluid volume 72b, which represents e.g. a closed air volume in a motor vehicle seat.

The filling and emptying processes can be controlled e.g. by means of a circuit arrangement and/or an actuation method of the type described above, wherein a control unit (microcontroller) incorporated in the vehicle can also provide a changeover between different operating modes of the active vibration damping in accordance with a suitable algorithm.

LIST OF REFERENCE SYMBOLS

10 Circuit arrangement
12 Bending transducer
14 Piezo actuator
16 Piezo actuator
in Actuation control signal
out Actuator drive signal
20 Driver
22 Driver input
24 Driver output
30 Detection device
32 Feedback device
34 Line arrangement
36 Line arrangement
40 Current source
42 Transimpedance amplifier
44 Reference voltage source
46 Low-pass filter
50 Microcontroller
52 Smoothing filter
54 Additional element
56 PI regulator
58 Output stage
60 Measuring element
62 Pressure measuring device
70 Directional valve
72 Fluid volume

What is claimed is:

1. A circuit arrangement for actuating a piezo valve with at least one actuator formed by a piezoelectric bending transducer, which has two piezo actuators running in elongated fashion in each case along a longitudinal direction of the bending transducer, comprising:
   at least one driver having a driver input for inputting an actuation control signal and a driver output for generating an actuator drive signal, which is to be output optionally to one of the two piezo actuators in a manner dependent on the actuation control signal,
   a detection device for detecting an electrical measurement variable at one of the piezo actuators which is currently not being driven, and
   a feedback device for generating a vibration damping signal on the basis of the detected measurement variable and feeding back the vibration damping signal to the driver input of the driver currently being used for providing the actuator drive signal.

2. The circuit arrangement according to claim 1, wherein the detection device has a current source for generating a current in a line connected to the piezo actuator which is currently not being driven, and a current measuring device for measuring said current.

3. The circuit arrangement according to claim 2, wherein the line is connected to the piezo actuator via a current-direction-dependent component.

4. The circuit arrangement according to claim 2, wherein the current measuring device comprises a transimpedance amplifier.

5. The circuit arrangement according to claim 2, wherein a gain of the current measuring device is provided in variable fashion.

6. The circuit arrangement according to claim 1, wherein a filter having a low-pas filter characteristic is provided in a signal feedback path of the feedback device.

7. The circuit arrangement according to claim 6, wherein a cut-off frequency of the low-pass filter characteristic is greater than a main resonant frequency of the bending transducer.

8. The circuit arrangement according to claim 6, wherein a cut-off frequency of the low-pass filter characteristic is less than a first secondary resonant frequency of the bending transducer.

9. The circuit arrangement according to claim 6, wherein the filter is an oscillatory low-pass filter having a resonant frequency between a main resonant frequency and a first secondary resonant frequency.

10. The circuit arrangement according to claim 1, wherein the vibration damping is provided such that it can be deactivated by a deactivation of the detection device and/or of the feedback device.

11. A method for actuating a piezo valve with at least one actuator formed by a piezoelectric bending transducer, which has two piezo actuators, extending in elongated fashion in each case along a longitudinal direction of the bending transducer, comprising:
   comprising generating an actuator drive signal, which is to be output optionally to one of the two piezo actuators, in a manner dependent on at least one actuation control signal,
   detecting an electrical measurement variable at one of the piezo actuators which is currently not being driven, and
   generating a vibration damping signal on the basis of the detected measurement variable and taking account of the vibration damping signal when generating the actuator drive signal for the piezo actuator which is currently being driven.

12. The method according to claim 11, further comprising generating by a current source a current in a line connected to the piezo actuator which is currently not being driven, and measuring said current by a current measuring device.

13. The method according to claim 12, wherein the line is connected to the piezo actuator via a current-direction-dependent component.

14. The method according to claim 12, wherein the current measuring device comprises a transimpedance amplifier.

15. The method according to claim 12, wherein a gain of the current measuring device is provided in variable fashion.

16. The method according to claim 11, wherein a filter having a low-pass filter characteristic is provided in a signal feedback path of the feedback device.

17. The method according to claim 16, wherein a cut-off frequency of the low-pass filter characteristic is greater than a main resonant frequency of the bending transducer.

18. The method according to claim 16, wherein a cut-off frequency of the low-pass filter characteristic is less than a first secondary resonant frequency of the bending transducer.

19. The method according to claim 16, wherein the filter is an oscillatory low-pass filter having a resonant frequency between a main resonant frequency and a first secondary resonant frequency.

20. The method according to claim 11, wherein the vibration damping is provided such that it can be deactivated by a deactivation of the detection device and/or of the feedback device.

* * * * *